(No Model.)
A. FELLDIN.
DAMPER FOR PIANOS.
No. 466,493. Patented Jan. 5, 1892.
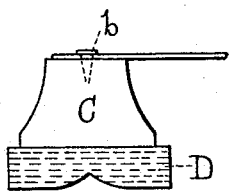
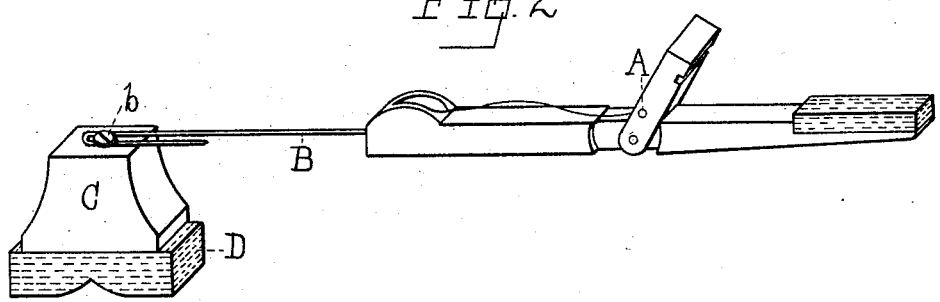
Witnesses:
Inventor:
Abraham Felldin,
By Frederick J. Allen
Attorney:

United States Patent Office.

ABRAHAM FELLDIN, OF AUBURN, NEW YORK.

DAMPER FOR PIANOS.

SPECIFICATION forming part of Letters Patent No. 466,493, dated January 5, 1892.

Application filed June 29, 1891. Serial No. 397,938. (No model.)

*To all whom it may concern:*

Be it known that I, ABRAHAM FELLDIN, of the city of Auburn, State of New York, have invented certain new and useful Improvements in Dampers for Pianos, of which the following is a description, reference being had to the accompanying drawings, forming part of this specification.

My invention consists in a novel method of securing the head-block of the damper to the damper-lever, by which it is actuated, whereby the adjusted position of the damper is maintained without danger of splitting the head-blocks, as in the usual manner of connections used for this purpose.

In the drawings, Figure 2 is a perspective view of the damper-lever, head-block, and connecting-rod; and Fig. 1 shows the head-block alone, with the screw for attachment of its connecting-rod shown by broken lines.

The damper-lever A is of usual construction and has the connecting-rod B inserted in one end. This rod has its free end recurved, as shown in the drawings, whereby a screw $b$, inserted into the head-block C, which bears the damper D, serves to connect the head-block and damper-lever. The connecting-rod is embedded in the head-block by the pressure of the screw $b$, so as to form a seat for itself and prevent the head-block from moving from its adjusted position, while the slot made by the recurved portion of the connecting bar or rod enables the head-block to be set at any required height from the lever.

Having thus described my invention, what I claim as new, and desire to secure by Letters Patent, is—

A damper for pianos, consisting of the damper-lever A, damper D, head-block C, and connecting-rod B, said rod having its free end recurved to form a slot and being secured to said head-block by means of a screw passing through said slot and into the back of said head-block.

ABRAHAM FELLDIN.

Witnesses:
FREDERICK I. ALLEN,
FRED. M. COFFIN.